(12) United States Patent
Robinson et al.

(10) Patent No.: US 8,477,376 B2
(45) Date of Patent: Jul. 2, 2013

(54) SYSTEM TO ENABLE DEVELOPMENT OF CLEAR TONER FORMS

(75) Inventors: David C. Robinson, Penfield, NY (US); Katherine Loj, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 411 days.

(21) Appl. No.: 12/968,843

(22) Filed: Dec. 15, 2010

(65) Prior Publication Data
US 2012/0154830 A1  Jun. 21, 2012

(51) Int. Cl.
G06K 1/00 (2006.01)
G03K 15/01 (2006.01)
B41J 2/21 (2006.01)
G06K 9/00 (2006.01)

(52) U.S. Cl.
USPC ......... 358/1.9; 358/3.28; 358/1.12; 358/1.15; 358/451; 358/474; 399/27; 399/28; 399/40; 399/49; 399/231; 347/19; 347/43; 347/98; 347/115; 347/172; 347/224; 382/100; 382/164; 382/167

(58) Field of Classification Search
None
See application file for complete search history.

(56) References Cited

U.S. PATENT DOCUMENTS

| | | | | |
|---|---|---|---|---|
| 5,309,246 A | * | 5/1994 | Barry et al. | 358/1.9 |
| 5,949,438 A | * | 9/1999 | Cyman et al. | 345/502 |
| 6,049,390 A | * | 4/2000 | Notredame et al. | 358/1.15 |
| 6,360,008 B1 | * | 3/2002 | Suzuki et al. | 382/167 |
| 6,950,209 B1 | * | 9/2005 | Das | 358/3.01 |
| 7,295,341 B2 | | 11/2007 | Nagarajan et al. | |
| 7,301,675 B2 | | 11/2007 | Wang et al. | |
| 7,517,041 B2 | * | 4/2009 | Palmer et al. | 347/15 |
| 2002/0176116 A1 | * | 11/2002 | Rhoads et al. | 358/405 |

OTHER PUBLICATIONS

U.S. Appl. No. 12/913,226, filed Oct. 27, 2010 titled "Simulated Paper Texture Using Clear Toner on Uniform Substrate", by Qiau Mu.

* cited by examiner

Primary Examiner — Steven Kau
(74) Attorney, Agent, or Firm — Fay Sharpe LLP

(57) ABSTRACT

A method for forming a variable data job includes a fixed original image provided by original image data in a first multiple channel color plane and content provided by variable image data in a second multiple channel color plane. The original image data is converted to fixed image data in a clear channel color plane. Raster image processing is performed on the fixed image data to translate the fixed image data into a first ready-to-print file. The ready-to-print file is saved in a memory as a post-RIP file. The variable image data is subsequently provided in at least the second multiple channel color plane. Image processing is performed on the variable image data to obtain a second ready-to-print file. The post-RIP file is merged with the second ready-to-print file for forming the variable data job. The variable data job is printed to render output.

20 Claims, 5 Drawing Sheets

SYSTEM TO ENABLE DEVELOPMENT OF CLEAR TONER FORMS

BACKGROUND

The present disclosure is directed toward a generally transparent mark rendered onto media and, more particularly, to a mark rendered onto the media using a system form.

A substrate carries information in the form of images, graphics, and textual content. Oftentimes, the substrate carries additional information in the form of an identifier, such as an authenticating mark or a watermark. A first type of mark is selectively detectable. The mark is not viewable under casual inspection. Rather, a visual aid alters a viewing condition to make the mark viewable. An example of the first type of mark includes a fluorescent watermark. The fluorescent watermark may be made viewable when an illuminant alters a light condition used to control either toner or substrate reflection. A second type of mark is detectable under casual inspection. An example of the second type of mark may include a raised surface portion on the substrate. Another example may include an image rendered on the surface portion.

The image is formed by applying a colored or monochrome ink or toner to the substrate. A lighter application of ink or toner is applied to the substrate as compared to a heavier application provided for the content. The lighter ink- or toner-application provides the mark with a generally washed out appearance. However, the image may still interfere with a viewer's ability to read the content also carried on the substrate. This difficulty is especially the case when a colored toner layer, used for the mark, is situated directly beneath the content layer. Accordingly, there is needed a new way of presenting marks. A mark is desired to include a generally transparent appearance. More particularly, a generally transparent mark is desired for casual inspection, whereby the mark includes a characteristic that makes it easily identifiable.

Generally, many known devices support an application for a light grey colored mark. This mark is rendered using a light application of monochrome ink or toner. However, there is needed a system for creating a mark formed with a clear toner layer. More particularly, there is needed a system for creating the mark in conjunction with additional information applied with a colored toner layer.

BRIEF DESCRIPTION

One embodiment of the disclosure is directed toward a method for forming a variable data job. An original image is provided including original image data in a first multiple channel color plane. The original image data is converted to fixed image data in a clear channel color plane. Raster image processing is performed on the fixed image data to translate the fixed image data into a first ready-to-print file. The ready-to-print file is saved in a memory as a post-RIP file. Variable image data is subsequently provided in at least a second multiple channel color plane. Image processing is performed on the variable image data to obtain a second ready-to-print file. The post-RIP file is merged with the second ready-to-print file for forming the variable data job. The variable data job is printed to render output.

In a second embodiment of the present disclosure, an image forming apparatus is adapted for printing a variable data job. The apparatus includes an input source for providing an original image including original image data in a first multiple channel color plane. A processor converts the original image data to fixed image data in a clear channel color plane. A raster image processor performs image processing on the fixed image data to translate the fixed image data into a first ready-to-print file. A memory saves the first ready-to-print file as a post-RIP file. A second input source subsequently provides variable image data in a second multiple channel color plane. A processor performs image processing on the variable image data to obtain a second ready-to-print file. A merging module merges the post-RIP file with the second ready-to-print file for forming the variable print job. A marking engine prints the variable data job. The marking engine includes a clear toner applying component for printing a fixed image using the clear channel color plane. A colored toner applying component is used for printing a variable image using the second multiple channel color plane.

DETAILED DESCRIPTION

Figure 1:
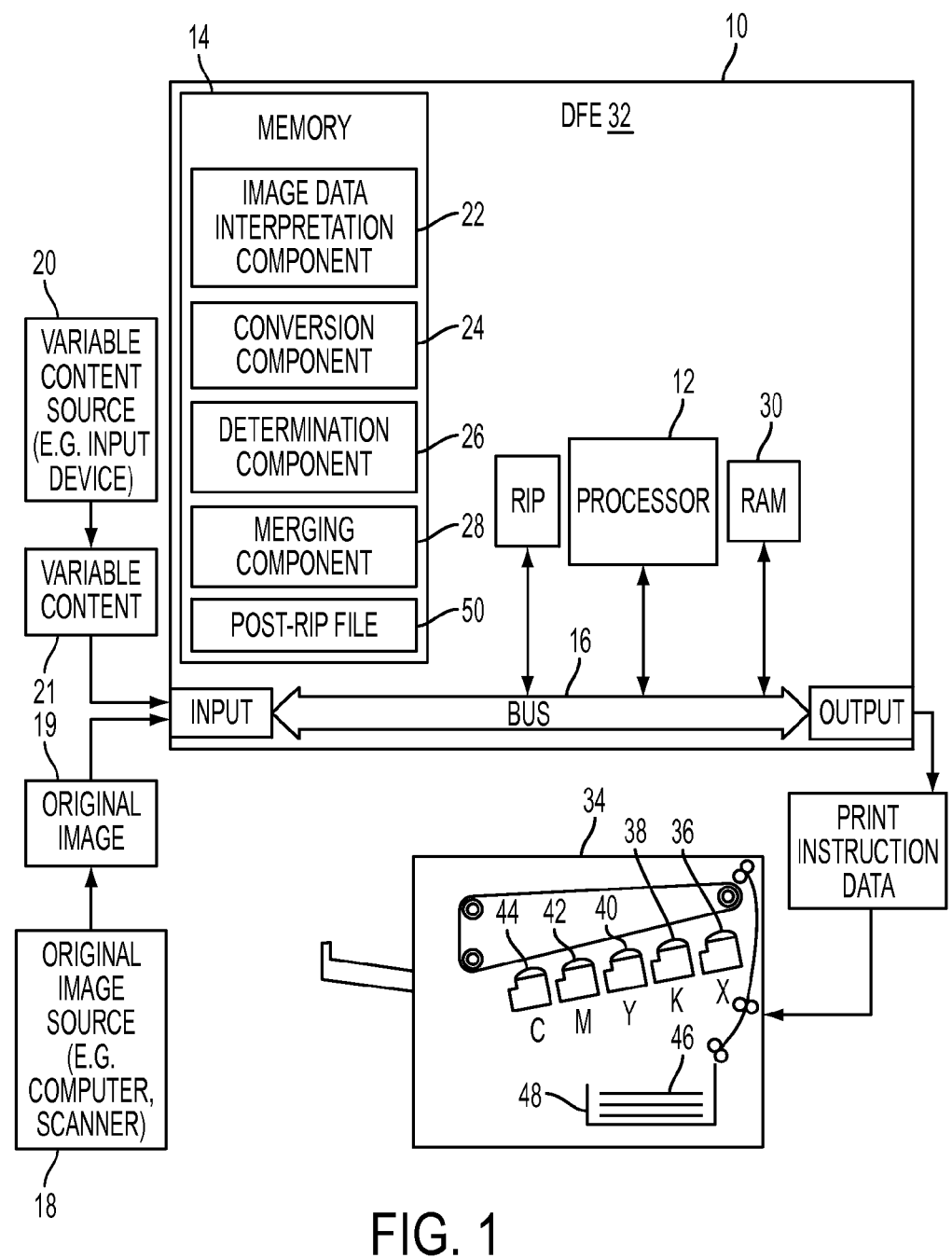
FIG. 1 illustrates a computer system for rendering a variable data job using a form of the disclosure.

The present disclosure is directed to a system that enables a development of clear toner forms. The disclosure is further directed toward a method for rendering a mark using a form adapted to provide a variable data job.

A variable data job, as referred to herein, includes page descriptions with variable data and fixed data. The fixed data portion corresponds with data that remains constant over multiple print jobs. The data is associated with a first image or information, referred to as "marks". The marks generally include authenticating marks, watermarks, and the like. The variable data portion(s) corresponds with data that optionally varies between the multiple print jobs and is referred to as "content". This data is associated with second information, such as text, graphics and images, which may change from one print job to the next. A print job is created for rendering one or more documents having the same fixed data and optionally variable data. A document refers to one or more pages included in a set. The print job may include multiple print sets.

The variable print job is achieved by a form that enables a development of the mark portion. A form includes information that remains constant from one print job to the next. This information is usually obtained from a database. The mark portion of the present disclosure is formed by an application of clear toner on a portion of a substrate surface. The clear toner includes non-pigmented marking particles. The clear toner is formed of the same particles used in primary (e.g., RGB) and subtractive (e.g. CMY and K) toners, except that the clear toner excludes the pigmenting component. The clear toner provides a noticeable glossy appearance. In certain instances, the clear toner may selectively provide a slight color cast. The gloss and/or cast may provide a visual appearance of a generally transparent image on the substrate.

Pigmented, colored toners are used herein to apply the content to the substrate. The content may include information in electronic form which is to be rendered on the substrate or print media by an image forming device. The content may include text, graphics, pictures, and the like. The process for applying the content and the mark to the substrate is herein referred to as printing or marking.

As used herein, the image forming device can include any device for rendering an image on print media, such as a copier, laser printer, bookmaking machine, facsimile machine, or a multifunction machine (which includes one or more functions such as scanning, printing, archiving, emailing, and faxing). "Print media" can be a usually physical sheet of paper, plastic, or other suitable physical print media substrate for carrying images. A "print job" or "document" is referred to for one or multiple sheets copied from an original print job sheet(s) or an electronic document page image, from a particular user, or otherwise related. An original image is used herein to mean an electronic (e.g., digital) or physical (e.g., paper) recording of information. In its electronic form, the original image may include image data in a form of text, graphics, or bitmaps.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

Figure 3:
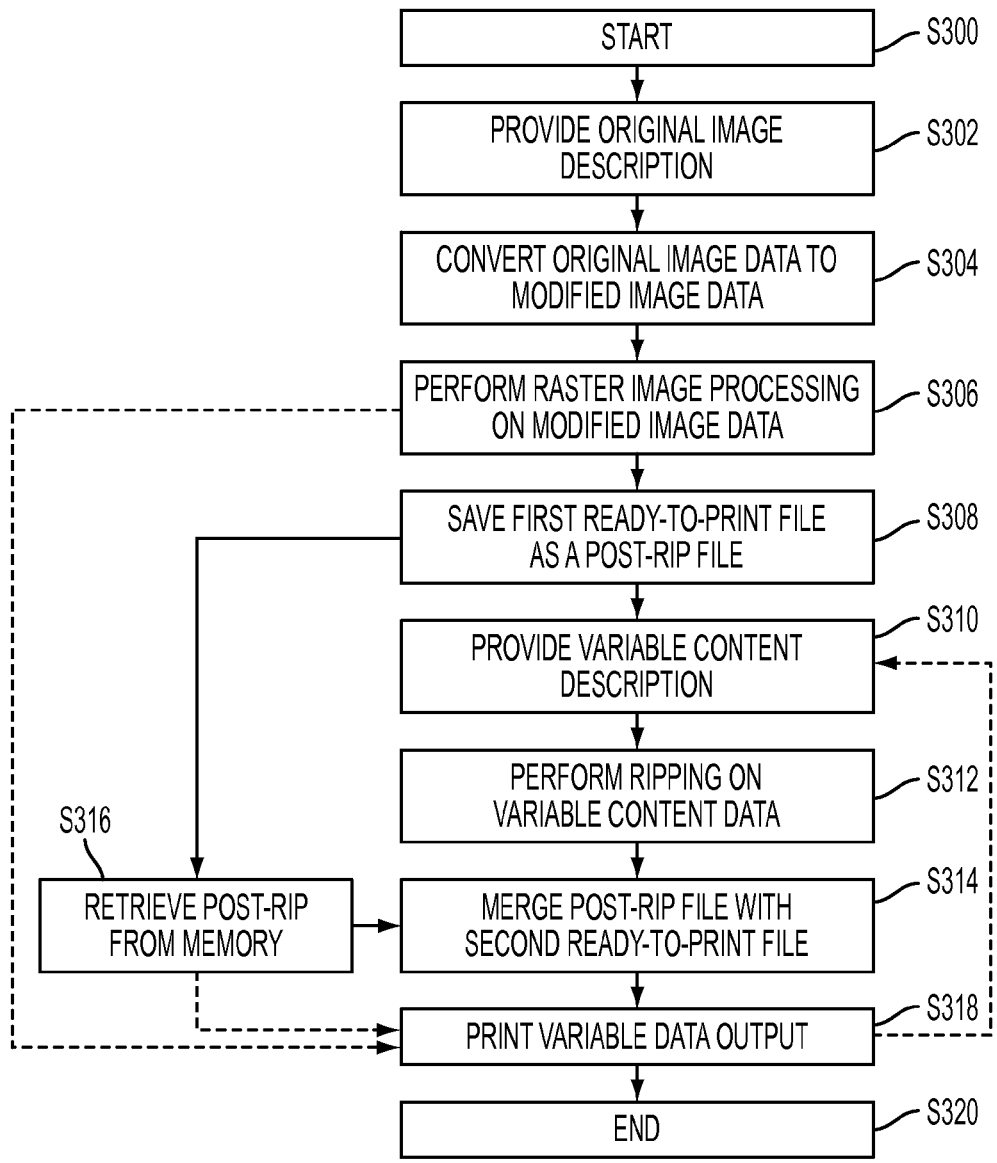
FIG. 3 is a flow chart illustrating a method for generating the variable data job.
Figure 4:
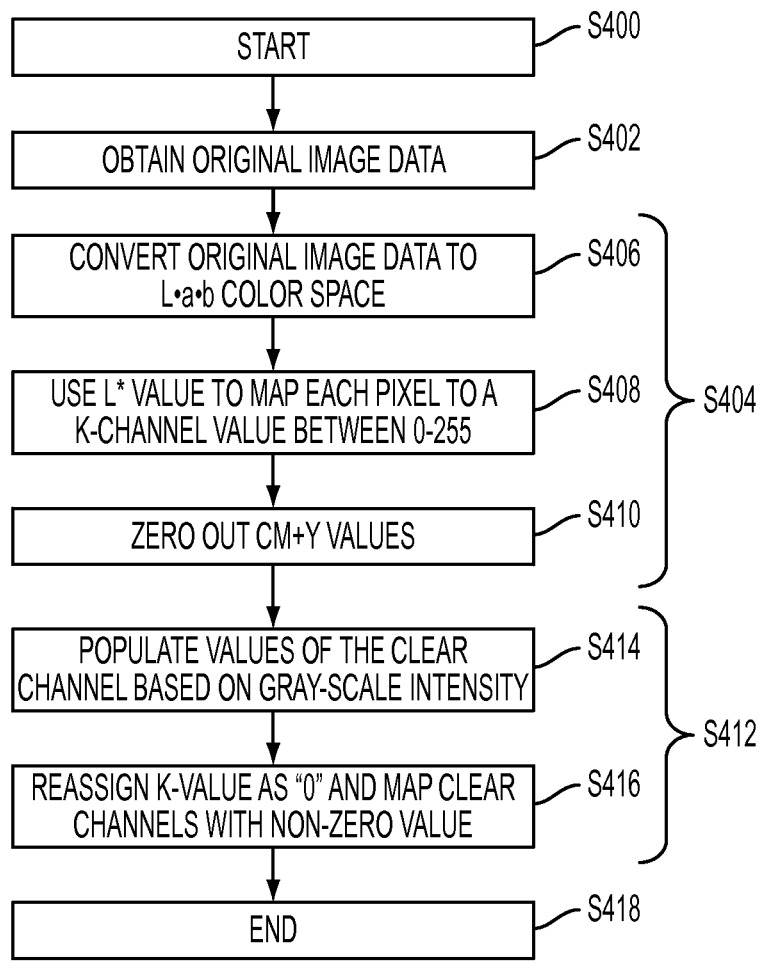
FIG. 4 is a flow chart illustrating an exemplary embodiment for converting the original image data to modified image data; and, FIG. 5 is a flowchart describing embodiments for selectively applying clear toner when the variable content description includes a clear channel.
Figure 5:
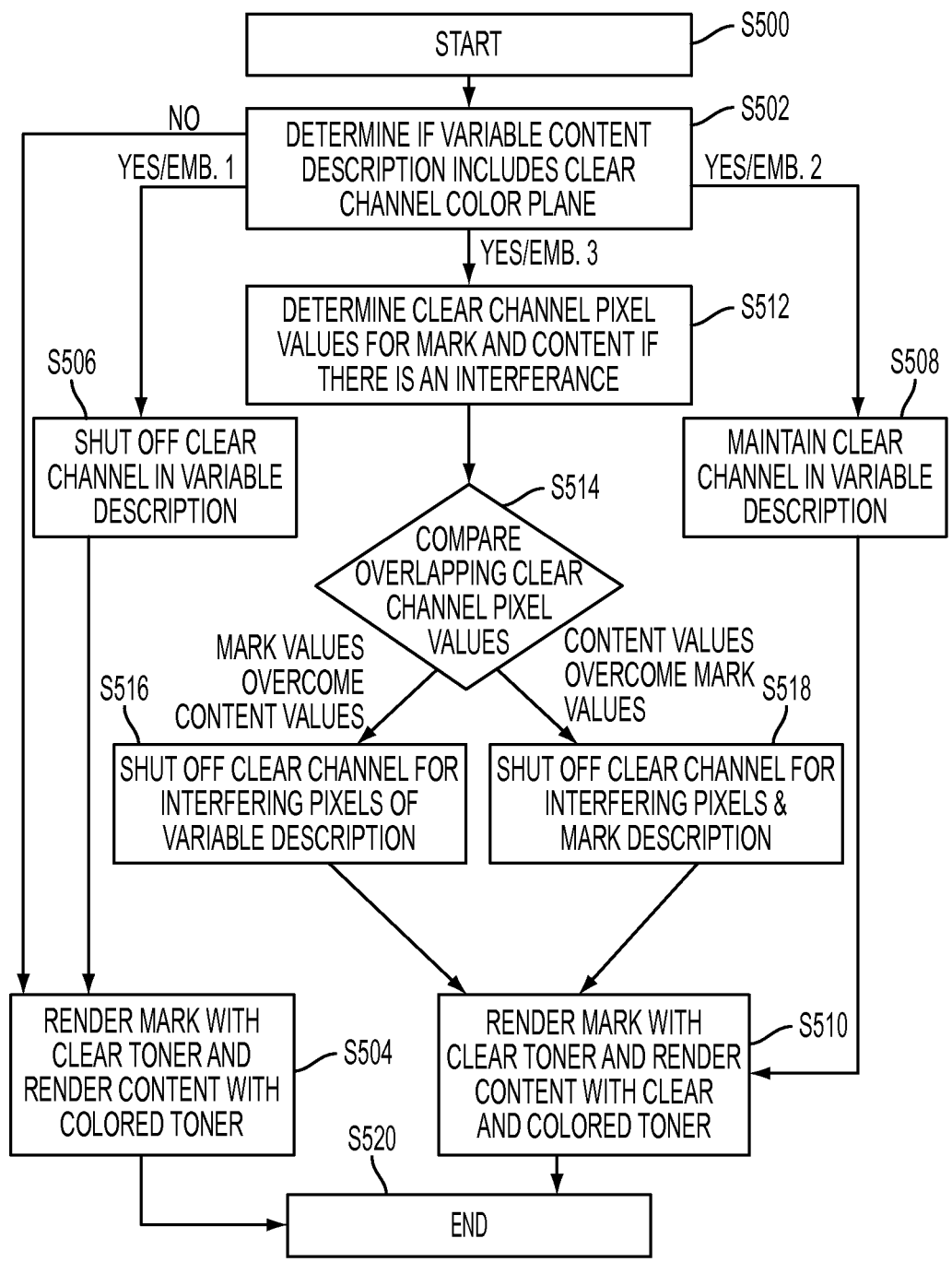

The method illustrated in FIGS. 3-5 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

With reference to FIG. 1, a functional block diagram of a computer system 10 is shown. The illustrated computer system 10 includes a processor 12, which controls the overall operation of the computer system 10 by execution of processing instructions which are stored in memory 14 connected to the processor 12. The system 10 may include multiple processors, wherein each processor is allocated to processing particular (sets of) instructions. Computer system 10 also includes a network interface and a user input output (I/O) interface. The I/O interface may communicate with one or more of a display, for displaying information to users, and a user input device, such as a keyboard or touch or writable screen, for inputting instructions, and/or a cursor control device, such as a mouse, trackball, or the like, for communicating user input information and command selections to the processor. The various components of the computer 10 may be all connected by a bus 16. The processor 12 executes instructions for performing the method outlined in FIGS. 3-5. The computer system 10 may be a PC, such as a desktop, a laptop, palmtop computer, portable digital assistant (PDA), server computer, cellular telephone, pager, or other computing device (e.g., multifunction printer/copier device) capable of executing instructions for performing the exemplary method.

The memory 14 may represent any type of tangible computer readable medium such as random access memory (RAM), read only memory (ROM), magnetic disk or tape, optical disk, flash memory, or holographic memory. In one embodiment, the memory 14 comprises a combination of random access memory and read only memory. In some embodiments, the processor 12 and memory 14 may be combined in a single chip. The network interface allows the computer to communicate with other devices via a computer network, such as a local area network (LAN), a wide area network (WAN), or the internet, and may comprise a modulator/demodulator (MODEM). The memory 14 stores instructions for performing the exemplary method as well as the processed data.

FIG. 1 further illustrates the computer system 10 connected to an original image source 18 for inputting image data 19 (in the form of a description of the original image) into the computer system 10. This original image source 18 may include an image capture device, such as a scanner or a camera, for converting an original colored or monochrome image 19 into an electronic format. A variable content source 20 is also connected to the computer for inputting variable content data 21 into electronic format. This variable content source 20 may include the same or a separate image capture device, such as a scanner, a computer, or the like. In one embodiment, the variable content source 20 may include an input device, such as, for example, a keyboard, for typewriting or digitally creating the variable content.

In another embodiment, the original image and/or variable content 19, 21 can be input from any suitable source, such as a workstation, a database, a memory storage device, such as a disk, or the like. Typically, each input digital image includes original image data for an array of pixels forming the image. The image data may include colorant values, such as gray-scale values, for each set of color separations, such as CIELAB or RGB, or be expressed in other color space in which different colors can be represented. In general, "gray-scale" refers to the optical density value of any single image data channel, however expressed (e.g., CIELAB, RGB, YCbCr, etc.). The images may be photographs, video images, combined images which include photographs along with text, and/or graphics, or the like. The images may be received in JPEG, GIF, JBIG, BMP, TIFF or other common file format used for images and which may be converted to another format such as CMYK colorant values prior to processing. Input textured and original images may be stored in the data memory during processing.

The electronic original image and variable content data is processed by the processor 12 according to the instructions contained in the memory 14. The memory 14 stores an image data interpretation component 22, a conversion component 24, a determination component 26, and a merging component 28. These components 22-28 will be later described with reference to the method. The data undergoes processing according to the various components for generating a print instruction, which is stored in the data memory 30.

The original image and variable content sources 18, 20 are in communication with a controller 32 or digital front end (DFE) containing the processor 12 and memories 14, 30. This controller 32 may be formed as part of at least one image forming apparatus for controlling an operation of at least one marking (or print) engine. Alternatively, the controller 32 may be contained in a separate, remote device that is connected with the image forming apparatus. The print instruction data may be output from the controller 32 for further print processing at the print engines.

The image forming apparatus includes at least one print engine 34. A clear toner applying component, such as cartridge 36, supplies clear toner for applying to a substrate passing through the print engine 34. In the illustrated embodiment of FIG. 1, the substrate 46 is delivered to the print engine from tray 48. A monochrome or color applying component (i.e., a source of pigmented toner), such as colorant toner cartridges 38-44, supplies at least one pigmented colorant (CMYK or other pigmented colorants) for applying colored toner to the substrate passing through the print engine 34. The clear toner applying component 36 and the colored toner applying component(s) 38-44 are illustrated as being included in one print engine 34; however, alternative embodiments are contemplated for including the clear toner applying component 36 in a first print engine and the colored toner applying component(s) 38-44 in a second print engine (not shown). The second print engine may receive the substrate 46 from the first print engine via a paper path. Alternatively, a colored toner applying component 38-44 may be included in a first print engine and a clear toner applying component 36 may be included in a second print engine. The substrate 46 may move from the first to the second print engine via a paper path or via the user taking the substrate from an output tray of the first print engine and placing it in an input tray of the second print engine.

The marking engine 34 includes many of the hardware elements employed in the creation of desired images by electrophotographical processes. In the case of a xerographic device, the marking engine typically includes a charge retentive surface, such as a rotating photoreceptor in the form of a belt or drum. The images are created on a surface of the photoreceptor. Disposed at various points around the circumference of the photoreceptor are xerographic subsystems which include a cleaning device, a charging station to be applied (one in the case of a clear toner applying printer, four in the case of a CMYK printer, and five in the case of a CMYK and clear toner applying printer), such as a charging corotron, an exposure station, which forms a latent image on the photoreceptor, a developer unit, associated with each charging station, for developing the latent image formed on the surface of the photoreceptor by applying a toner to obtain a toner image, a transferring unit, such as a transfer corotron, for transferring the toner image thus formed to the surface of a print media substrate, and a fuser, which fuses the image to the substrate. The fuser generally applies at least one of heat and pressure to the sheet to physically attach the toner.

As mentioned, the present disclosure is directed toward a mark in the form of an authenticating or watermark rendered on a substrate. The mark is applied with a clear toner. The mark is observed as a generally glossy image. The disclosure is more specifically directed toward a method of generating the generally clear mark on a form of the system. The disclosure is also directed toward the system for enabling multiple renderings of a variable data job using the form.

Figure 2:
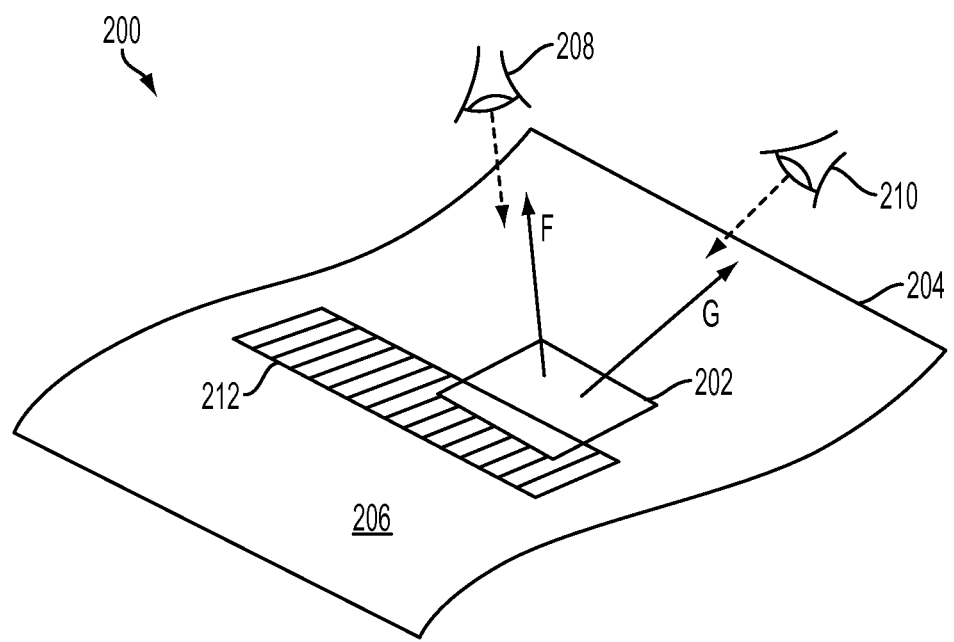
FIG. 2 illustrates a perspective view of a variable job output using the system of FIG. 1.

FIG. 2 illustrates a variable print output 200 including a mark 202 rendered on a substrate 204. The mark 202, as mentioned, includes an observable watermark or authenticating mark formed on a surface portion of the substrate 204. The mark 202 is generally transparent, so it appears at first glance to be unobservable. However, the mark 202 includes a visual characteristic that alters the surface portion in relation to a surrounding surface portion 206 (or background) of the substrate 204. This characteristic may include, for example, a generally glossy appearance. The appearance may alternatively include, for example, a slight cast.

More specifically, the mark 202 may have a flat or matte appearance F when it is viewed from a generally perpendicular position 208 situated generally above the mark 202. However, the mark 202 is observable as a glossy appearance when it is viewed from an angled position 210 relative to the substrate 204. One aspect of the disclosure is that the mark 202 is observable without requiring a use of a visual aid.

In one embodiment, the substrate 204 may include a matte appearance. Accordingly, the glossy mark 202 is observable as an image having the generally glossy appearance, which is surrounded by a generally matte background 206. In another embodiment, the substrate 204 may also include a glossy appearance. In this embodiment, the mark 202 may include a first degree of gloss, and the substrate 204 may include a second degree of gloss. The first degree of gloss is not equal to the second degree of gloss. In one embodiment, the first degree of gloss is greater than the second degree of gloss.

With continued reference to FIG. 2, the mark may be included on a substrate 204 that also carries a second image in the form of content 212. As mentioned, this content is rendered on the substrate 204 as pictorial images, graphics, text, and the like. The content 212 is formed from a layer of colored or monochrome toner. The content 212 includes a generally flat or matte appearance characteristic at perpendicular and angled perspectives. Embodiments are contemplated, however, to include content 212 also having a gloss characteristic. Because the colored and/or monochrome toner includes pigmented material, the content 212 is observable as having a generally visible color contrast relative to the substrate 204. The mark 202 is alternatively observable as not having a generally visible color contrast relative to the substrate 204.

With reference to FIG. 3, a flow chart is provided for describing a process of forming a variable data job. The method starts at S300. An original image source is used to input an original image at S302. The original image includes a monochrome or a colored image selected for use as the mark. For example, a selected pictorial image, such as a monogram, may be input into the system for use as the mark on letterheads or formal documents. The colored monogram is used as a starting sample, and data pulled from the original monogram image is converted so that a clear monogram image may be output instead. Other examples include festive pictorial images for use on holiday cards or invitations, authenticating marks for use on security documents, company logos on prepared documents, and the like.

The original image may be input into the system using the image source 18 described for FIG. 1. In particular embodiments, the original image may be generated using a computer or a scanner. In other embodiments, the original image may be stored in a memory or database. The original image data is then provided to the system by selectively accessing the memory or database.

The original image is provided at S302 as digital image data in a multiple channel color plane. Generally, a (full) colored original image includes an image description in a color space that is three-dimensional. More particularly, the color may be parameterized by three numbers (or more depending on the color model or architecture being used). For example, a description for CMY data streams may be conveyed through three channels. A description for CMYK data streams may be conveyed through four channels. The system may utilize the Image Data Interpretation Component 22 of FIG. 1 to obtain the data. This data, for example, includes a C pixel value, an M pixel value, a Y pixel value, and a K pixel value. Each value associated with a pixel influences a placement of primary-color colorant (ink or toner) in a pixel area.

The system converts the original image data to modified image data in a clear channel color plane at S304. Methods of converting the original image data are later discussed with reference to FIG. 4. Generally, the multiple channel color plane is converted to a single clear channel color plane. A clear pixel value is determined using the conversion component 24 of FIG. 1.

A print command may be instituted to render a clear image on a substrate using the clear channel color plane. Alternatively, a command may be selected to include the clear image as a fixed image on a form. At S306, raster image processing (RIPping) is performed on the modified image data (i.e., mark description) to translate the modified image data into a first ready-to-print file. A raster image processor (RIP) of the system provides output data in a format that is suitable for rendering by an output device. Generally, the RIP translates the modified image description into a bitmap for output by the output device. At this stage, a clear mark may be applied to a substrate at the image forming apparatus.

One aspect of the present disclosure, however, is a form for producing multiple, intermittent print jobs using the clear channel color plane. Accordingly, the first ready-to-print file may be saved as the form in the memory. The mark becomes a fixed image in a post-RIP file (see 50 of FIG. 1) at S308. For example, a Fast Reprint Format (FRF) may be used to save the post-RIP file. In one embodiment, the form is saved by default to a unique file location. The default location removes the clear mark forms from the standard background forms that do not utilize clear toner applying printing systems. Any known process may be used to save and subsequently process the print-ready format. In this manner, the form is created.

The post-RIP file may be selectively accessed at later dates. One example of when the post-RIP file may be accessed includes an addition of variable information to the substrate of which the mark is to be applied. With continued reference to FIG. 3, variable image (or content) data may be selectively provided at S310. As in a previously mentioned example, the content of an invitation-style document may include the pertinent information regarding times and dates, which may overlay or be rendered in proximity to the monogram mark. Other examples of documents may include business forms, custom calendars, and security documents, etc.

Generally, the mark description that is saved as the post-RIP file may be utilized for producing fixed images on substrates, and the content description that is subsequently provided may be utilized for variable images on the substrates. Accordingly, the mark description may be utilized in a formation of multiple documents and print jobs when an application for the form is selected by users.

The variable content data is also provided in a second multiple channel color plane. Accordingly, the variable content may be provided for printing in a colored or a monochrome format. The variable content description may be generated from content or images input into the computer system by also using an input device, such as a keyboard, a scanner, etc. Alternately, the variable content may be provided to the computer system by way of any of the examples set forth above.

To print a variable data job, a user may select a print option from a window, a menu, or the like corresponding to an application displaying the form. The user may selectively provide the variable content before entering a print command. The print command institutes raster image processing on the variable content data at S312 to provide a second ready-to-print file. This image processing is performed on the content data to translate it into a bitmap or similar page description. This page description is stored in data memory 30 until it is subsequently forwarded to the marking engine 34 for further processing.

The merging component 28 of memory 14 (see FIG. 1) is used to merge the post-RIP file with the second ready-to-print file at S314. In this manner, the merging component obtains the post-RIP (or first ready-to-print) file from the default location in the (main) memory 14 and the second ready-to-print file from data memory 30. More particularly, the bitmap of the processed mark image is retrieved from the memory 14 at S316 for merging with the image processed (bitmap of the) content information.

The merged bitmaps of the mark image and the content are forwarded to the marking engine for further processing. Accordingly, the variable data job may be rendered from the marking engine to produce the variable data output at S318. The process ends at S320. However, additional variable data jobs may be subsequently created by returning to the form at S310, which provides for input of new or changed content information.

One aspect of the present disclosure is a controlled hierarchy of priority for the channels that are used during a printing scheme. As mentioned, a colored or monochrome original image is input into the computer system. However, the monochrome and/or color channels are shut off for image processing and/or printing of the original image as a clear image on the form. These values are shut off with the zero "0" value assignment for each channel other than the clear channel. The multiple channel color plane is converted to a modified channel color plane. In the present embodiment, this modified channel color plane is a clear channel color plane. Accordingly, only the clear channel is used during a printing operation for determining an amount of clear toner applied to a substrate.

With reference to FIG. 4, a flow chart is provided for describing a process for converting the original image data to modified image data. The process starts at S400. As previously mentioned, the original image that is provided and/or generated to the system includes multiple channels that handle data relating to the primary (RGB) or subtractive (CMYK) color planes. Original image data is obtained at S402 for each one channel of the multiple channel color plane. In a first stage of the conversion, the digital data obtained from a full-color original image is converted to a monochrome data set at S404. Many known techniques may be utilized to convert the colored digital data to the monochrome data set. There is no limitation made herein to the technique utilized. In one example, the original image data may be used to map a gray-level image.

Generally, regions are identified by assigned image pixel values in a suitable color space, such as the luminance value in the L*a*b* color space. The digital data of the original image is converted from a colored space to the device independent L*a*b* color space at S406. The data may be converted from the first color space to the L*a*b* color space using calculations, look-up tables, dedicated chips, portions of chips, (general-purpose) processors, and software.

In one embodiment, the values of the color space are combined into a single luminance value L* and the a* and b* values are discarded. Each pixel of the original image is described as the luminance value L*, representing brightness.

The value of the pixel is mapped at S408 to a K-channel value between 0 and 255 on an 8-bit scale. The zero value (0) is assigned to black pixels and the 255 value is assigned to white pixels. Any value situated in between the 0 and 255 range describes a different shade of gray. The shades of gray correspond to the gray-scale intensity between 0 and 255 for each one pixel of the original image data. The monochrome results make up the monochrome set. The amounts of monochrome toner that would be applied to the substrate in a monochrome print operation correspond to the gray-scale intensity.

In another embodiment, the monochrome set may also be derived by an inverse of the luminance L* signal of the L*a*b* color space. Generally, colored image data is converted to the monochrome data set because the K values of the colored space take into account the CM and Y values of the color space. Therefore, the monochrome data set is derived from the L* signals at S408, and the CMY data is essentially "shut off" at S410. The system shuts off the CM and 7 channels by replacing the pixel values to zero "0". As mentioned, if the present modified (mark) image were printed at this stage of the process, the monochrome output would be produced. However, further actions are performed on the modified mark image to produce a clear image output. The system includes an instruction for resetting the monochrome data set as a clear data set at S412. A relationship of the value to the "K" channel is reset to populate values of the clear channel at S414. In other words, the gray-scale intensity for the gray level image is mapped to a transparent image. The gray-scale intensity is converted to a clear toner pixel value. After the clear channel is mapped using the non-zero K values, the K-value of the monochrome set is reassigned a zero "0" value at S416. Accordingly, any non-zero value is mapped in the clear channel plane while the other CMY and K channels of the color space are shut off with assigned zero "0" values.

In one embodiment, the clear channel pixel value may be used as an input variable for computing an amount of clear toner. This amount may include, for example, a clear toner halftone value that is computed at either of the system or the printer. Different clear toner halftone values are assigned to pixels of a substrate surface region to render the mark image. The different halftone values for pixels across the region may vary a gloss characteristic of the mark image across the region. This gloss characteristic may provide perceived, observable elements to the image at certain angled perspectives. The conversion process ends at S418.

In variable data jobs, there may be content that also includes a description in a second multiple channel color plane. Accordingly, a colorant toner renders the content onto the same substrate carrying the clear toner layer of the mark. However, there may be instances when the variable image data includes a five channel color plane. More particularly, the description for the variable content may include multiple color channels (e.g., CMY and K channels) and a clear channel. One example of content that may utilize all five channels may include a colored image having a glossy appearance. Accordingly, there may be instances when both the post-RIP file and the second ready-to-print file include instructions for rendering clear toner layers. In these instances, the computer system controls the application of clear toner based on a predetermined, programmed hierarchy.

FIG. 5 illustrates a flowchart describing embodiments for applying clear toner when the variable content description includes a clear channel. With reference to the figure, the process starts at S500. The processor determines if the variable content description includes a clear channel color plane at S502. The processor uses the determination component 26 of FIG. 1 to make the determination. If the variable content description does not include a clear channel color plane, the controller shuts off the multiple color and/or monochrome channels of the mark description (NO at S502). More particularly, these colored and monochrome channels may be shut off when the form is generated. At S504, the printer instruction is sent to render the mark (image) onto the substrate with a clear toner applying component, and to render the variable content onto the substrate with at least one colored or monochrome toner applying component.

If the determination at S502 indicates that the variable content description includes a clear channel color plane, then one of multiple processing actions may occur. In a first embodiment (YES/EMB. 1 at S502), the clear channel color plane of the variable content description is shut off at S506. Accordingly, the variable content is rendered onto the substrate using remaining colored and/or monochrome channels. More particularly, the variable content may be applied using only the colored and/or monochrome toner applying components at S504. The form and/or mark image may be applied using only the clear toner applying component at S504.

In a second embodiment (YES/EMB. 2 at S502), the clear channel is maintained at S508 (i.e., not shut off) for the variable content description. Rather, image processing is performed for both the form (i.e., mark) and the content clear channel values. At S510, the mark (i.e., fixed image) is rendered onto the substrate with a clear toner applying component, and the variable content is rendered onto the substrate with a clear toner applying component and at least one of a colored or monochrome toner applying component. This embodiment is particularly applicable when the mark is applied to a first surface portion of a substrate and the content is applied to a second surface portion of the substrate. More particularly, the first surface portion does not interfere with the second surface portion.

Embodiments are contemplated, however, to include a first one of the mark and content formed on a surface portion overlaying a second one of the mark and content also formed on the same surface portion. With continued reference to FIG. 5, a third embodiment (YES/EMB. 3 at S502) includes a decision action based on a comparison of clear channel pixel values for overlapping content and mark images. The clear channel pixel values are determined and/or obtained at S512 for both the form (i.e., mark) and the variable content descriptions. The comparison is made for each one pixel that provides an interference. An interference is referred to herein as a pixel having a first clear channel value for the mark image and a second clear channel value for the content image. Therefore, a first one (clear value) of the mark or content interferes with a second one (clear value) of the mark or content for the same pixel. The clear channel pixel values for the mark are compared to the clear channel pixel values for the content at S514. In one embodiment, the system may base the printing instructions on the determined higher pixel values. In another embodiment, the system may base the printing instructions on the determined lower pixel values. Using the predetermined standard, printing actions may be based on the pixel values of a first description that overcome or take precedence over the pixel values of a second description. For example, if the predetermined standard is based on the pixel values that are determined as being higher, then the mark or content description including higher clear channel pixel values overcomes the remaining one of the mark or content description having lower channel pixel values. If the predetermined standard is based on the pixel values that are determined as being lower, then the mark or content description having lower clear channel pixel values overcomes the remaining one of the mark or content description having higher channel pixel values.

Continuing with the discussed embodiment, the system is adapted to instruct at least one marking engine to use a clear toner applying component in accordance with the comparison results. If the clear channel pixel values for the mark overcome the clear channel pixel values of the variable content, the clear channel is shut off at S516 for pixels of the variable content at portions that overlap the mark. Accordingly, the variable data job is printed using the clear toner applying component to render the mark and the colored and/or monochrome toner applying components to render the content at S504. If the clear channel pixel values for the content overcome the clear channel pixel values for the mark, the instructions shut off the clear channel at S518 pixels of the mark at the portions that overlap the content. The clear toner applying component may be used, however, to render portions of the variable content that do not overlay or underlay the mark. The clear toner applying component and a colored or monochrome toner applying component may be used to render the content at S510. The clear toner applying component may be used, however, to render portions of the mark that do not overlay or underlay the content. In other words, portions of the mark or content that are to be applied to separate and distinct surface regions of the substrate are rendered according to their respective clear channel descriptions. The process ends at S520.

In one embodiment, the controller may determine by which process the variable data job is output. In other embodiments, the user may select the determination process for outputting a variable data job. In the present disclosure, the form is generated and accessed using color management source settings. Options may be presented to the user for handling of the original clear values in the image. In one embodiment, the user may select an option to shut off the clear values in the variable content. This selection follows the embodiment marked as "Emb. 1" in FIG. 5.

In alternate embodiments, the user may select that the clear values in the variable content take precedence or the clear values for the mark take precedence. If the user selects that the values of the mark take precedence (MARK VALUES OVERCOME CONTENT VALUES at S514), then the clear channel is shut off at S516 for pixels of the variable content at portions that overlap the mark. If the user selects that the values of the mark take precedence (CONTENT VALUES OVERCOME MARK VALUES), then the instructions shut off the clear channel at S518 pixels of the mark at the portions that overlap the content. The present discussed selections may be made using an application of the system directed to generating and accessing the form. It is contemplated that the "clear forms" that are created may be associated with subsequent jobs using clear forms of edit selections made available through pull-down menus or various windows of an application. Adjustments may be made to each form in a manner similar to that of which is made available for typical background forms. When a "use form" selection is made, however, the present system presents the user with a display of saved or a new clear background form, which is accessed through the default location. This default location may be the initial file location presented to the user.

Other available selections may be made by a user to define the clear form. For example, the user may enter a selection for printing the clear mark image as an overlay. Accordingly, a logical top layer of clear toner is rendered over a colored content layer. The CMYK or other colorants of the content may show through the clear layer. In another embodiment, the user may enter a selection for printing the clear mark image as a knockout overlay. Accordingly, a top layer of clear toner may be formed over a colored layer of pigmented toners. In this embodiment, the clear coat top layer may prevent the colored layer from being printed. In yet another embodiment, a layer of clear toner may be rendered as an underlay. Accordingly, a top layer of colored toner may be rendered logically over the clear mark image. The top layer of CMYK or similar pigmented ink will allow the clear layer to be printed.

A further embodiment may include a clear toner layer rendered as an underlay with a knockout. Accordingly, the top layer of CMYK or similar pigmented toners may prevent the clear layer from being printed.

Although the control methods of FIGS. 3-5 are illustrated and described below in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated actions may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 10, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for forming a variable data job, comprising:
providing an original image including original image data in a first multiple channel color plane;
converting the original image data to fixed image data in a clear channel color plane;
performing by a raster image processor image processing on the fixed image data to translate the fixed image data into a first ready-to-print file;
saving in a memory the first ready-to-print file as a post-RIP file;
subsequently providing variable image data in at least a second multiple channel color plane;
performing image processing on the variable image data to obtain a second ready-to-print file;
merging the post-RIP file with the second ready-to-print file for forming the variable data job; and,
printing the variable data job.

2. The method of claim 1, wherein the saving of the post-RIP file utilizes the Fast Reprint Format (FRF).

3. The method of claim 1, wherein the fixed image data includes a watermark description.

4. The method of claim 1, wherein the converting includes:
obtaining the original image data for each one channel of the first multiple channel color plane; converting the original image data to a device independent L*a*b color space; deriving a monochrome data set from the luminance signal L*; and, modifying the monochrome data set to a clear data set for populating a clear channel color plane.

5. The method of claim 4, wherein the printing includes:
printing a fixed image using only the clear channel color plane and not the first multiple channel color plane; and,
printing a variable image using at least the second multiple channel color plane.

6. The method of claim 5, further including:
printing the fixed image using a clear toner applying component, wherein an amount of clear toner applied to a media corresponds to pixel values contained in the clear channel color plane; and,
printing the variable image using a colored toner applying component, wherein the amount of colored toner applied to the media corresponds to the pixel values contained in the second multiple channel color plane.

7. The method of claim 1, further including:
determining whether the variable image data further includes a second clear channel color plane;
determining pixels of which there is an overlap between the first and second clear channel color planes of the fixed image data and the variable image data.

8. The method of claim 7, further including:
printing at overlapping clear channel pixel values a fixed image using a clear toner applying component using only the clear channel color plane and not the multiple channel color plane;
printing at the overlapping clear channel pixel values a variable image using a colored toner applying component using only the multiple channel color plane and not the clear channel color plane; and,
printing at non-overlapping clear channel pixel values the fixed image and the variable image using the clear toner applying component.

9. The method of claim 7, wherein if there are overlapping clear channel pixel values, the printing includes:
printing at the overlapping pixel values one of a fixed image or variable image using a clear toner applying component, wherein the one is selected based on pixel values in the first and second clear channel color planes; and,
printing the variable image using at least one colored toner applying component.

10. The method of claim 9, wherein the one of the fixed image or variable image selected includes pixel values in one of the first and second clear channel color planes that overcome pixel values in a remaining one of the first and second channel color plane.

11. The method of claim 1, wherein the converting includes:
obtaining the original image data for each one channel of the first multiple channel color plane;
mapping the original image data for a full color image to a gray level image, including computing a gray-scale intensity between 0 and 255 for each one pixel of the original image data using a luminance of the each one pixel in the original image; and,
mapping the gray-scale intensity for the gray level image to a transparent image, including converting the gray-scale intensity to a clear toner pixel value.

12. The method of claim 11, wherein the printing includes applying a halftone pattern based on the clear toner pixel value using a clear toner applying component.

13. A system for forming a variable data job, comprising:
a first input source for providing an original image for obtaining fixed image data in a first multiple channel color plane;
a processor for converting the fixed image data to a clear channel color plane;
a raster image processor for performing image processing on the fixed image data to translate the fixed image data into a first ready-to-print file;
a memory for saving the first ready-to-print file as a post-RIP file;
a second input source for subsequently providing variable image data in a second multiple channel color plane;
a processor for performing image processing on the variable image data to obtain a second ready-to-print file;
a merging module for merging the post-RIP file with the second ready-to-print file for forming the variable data job; and,
a marking engine for printing the variable data job.

14. The system of claim 13, wherein the first input source is the same as the second input source.

15. The system of claim 13, wherein the processor is adapted to obtain the original image data for each one channel of the multiple channel color plane, convert the original image data to a device independent L*a*b color space, derive a monochrome data set from the luminance signal L*, and modify the monochrome data set to a clear data set for populating a clear channel color plane.

16. The system of claim 15, further including:
a clear toner applying component for printing a fixed image using the first clear channel color plane; and,
a colored toner applying component for printing a variable image using the second multiple channel color plane.

17. The system of claim 13, wherein the processor is adapted to further determine whether the variable image data includes a second clear channel color plane.

18. The system of claim 17, further including a controller, wherein if the variable image data includes the second clear channel color plane, the controller controls printing at overlapping pixels using a clear toner applying component, wherein one of the fixed and variable image is printed at the overlapping pixels, the one being based on pixel values in one of the first and second clear channel color planes that overcome pixel values in a remaining one of the first and second channel color planes.

19. The system of claim 13, wherein the processor is adapted to obtain the original image data for each one channel of the multiple channel color plane, map the original image data for the original image to a gray level image by computing a gray-scale intensity between 0 and 255 for each one pixel of the fixed image data using a luminance of the each one pixel in the original image, and map the gray-scale intensity for the gray level image to a transparent image by converting the gray-scale intensity to a clear toner pixel value.

20. An image forming apparatus adapted for printing a variable data job, including:
an input source for providing an original image including original image data in a first multiple channel color plane;
a processor for converting the original image data to fixed image data in a clear channel color plane;
a raster image processor for performing image processing on the fixed image data to translate the fixed image data into a first ready-to-print file;
a memory for saving the first ready-to-print file as a post-RIP file;
a second input source for subsequently providing variable image data in a second multiple channel color plane;
a processor for performing image processing on the variable image data to obtain a second ready-to-print file;

a merging module for merging the post-RIP file with the second ready-to-print file for forming the variable print job; and, a marking engine for printing the variable data job, including:

a clear toner applying component for printing a fixed image using the clear channel color plane, and a colored toner applying component for printing a variable image using the second multiple channel color plane.

* * * * *